US008885488B2

(12) United States Patent
Vobbilisetty et al.

(10) Patent No.: US 8,885,488 B2
(45) Date of Patent: Nov. 11, 2014

(54) REACHABILITY DETECTION IN TRILL NETWORKS

(75) Inventors: Suresh Vobbilisetty, San Jose, CA (US); Phanidhar Koganti, Sunnyvale, CA (US); Arun Mahajan, Palo Alto, CA (US)

(73) Assignee: Brocade Communication Systems, Inc., San Jose, CA (US)

( * ) Notice: Subject to any disclaimer, the term of this patent is extended or adjusted under 35 U.S.C. 154(b) by 0 days.

(21) Appl. No.: 12/950,974

(22) Filed: Nov. 19, 2010

(65) Prior Publication Data

US 2011/0299409 A1 Dec. 8, 2011

Related U.S. Application Data

(60) Provisional application No. 61/380,814, filed on Sep. 8, 2010, provisional application No. 61/350,827, filed on Jun. 2, 2010.

(51) Int. Cl.
*G01R 31/08* (2006.01)
*H04L 12/26* (2006.01)
*H04L 12/701* (2013.01)
*H04L 12/721* (2013.01)

(52) U.S. Cl.
CPC ............ *H04L 45/00* (2013.01); *H04L 43/0811* (2013.01); *H04L 45/66* (2013.01)
USPC ......................... 370/248; 370/241.1; 370/249

(58) Field of Classification Search
CPC ..... H04L 45/66; H04L 12/4641; H04L 45/00; H04L 49/70; H04L 12/4633; H04L 45/02; H04L 43/10; H04L 61/103; H04L 47/10; H04L 45/586; H04L 41/0213; H04L 45/04; H04L 45/26; H04L 45/28; H04L 12/46; H04L 45/38; H04L 45/74

USPC ......... 370/224, 241, 242, 244, 248–252, 401; 709/224

See application file for complete search history.

(56) References Cited

U.S. PATENT DOCUMENTS 5,390,173 A 2/1995 Spinney
5,802,278 A 9/1998 Isfeld (Continued)

FOREIGN PATENT DOCUMENTS

| CN | 102801599 A | 11/2012 |
| EP | 1916807 A2 | 4/2008 |
| EP | 2001167 A1 | 12/2008 |
| WO | 2010111142 A1 | 9/2010 |

OTHER PUBLICATIONS

"RBridges: Base Protocol Specification", IETF Draft, Perlman et al., Jun. 26, 2009.*
Brocade Unveils, "The Effortless Network" Mar. 2012.

(Continued)

*Primary Examiner* — Awet Haile
(74) *Attorney, Agent, or Firm* — Shun Yao; Park, Vaughan, Fleming & Dowler LLP

(57) ABSTRACT

One embodiment of the present invention provides a system for testing reachability between two nodes within a network. During operation, the system transmits a network-testing request frame from a source node to a destination node, and in response to receiving a network-testing response frame corresponding to the request frame, the system determines reachability of the destination node. The network-testing request or response frame is not processed on an Internet Protocol (IP) layer.

21 Claims, 10 Drawing Sheets

(56) References Cited

U.S. PATENT DOCUMENTS

| | | |
|---|---|---|
| 5,983,278 A | 11/1999 | Chong |
| 6,041,042 A | 3/2000 | Bussiere |
| 6,085,238 A | 7/2000 | Yuasa |
| 6,104,696 A | 8/2000 | Kadambi |
| 6,185,241 B1 | 2/2001 | Sun |
| 6,438,106 B1 | 8/2002 | Pillar |
| 6,542,266 B1 | 4/2003 | Phillips |
| 6,633,761 B1 | 10/2003 | Singhal |
| 6,873,602 B1 | 3/2005 | Ambe |
| 6,975,581 B1 | 12/2005 | Medina |
| 6,975,864 B2 | 12/2005 | Singhal |
| 7,016,352 B1 | 3/2006 | Chow |
| 7,173,934 B2 | 2/2007 | Lapuh |
| 7,197,308 B2 | 3/2007 | Singhal |
| 7,206,288 B2 | 4/2007 | Cometto |
| 7,310,664 B1 | 12/2007 | Merchant |
| 7,313,637 B2 | 12/2007 | Tanaka |
| 7,330,897 B2 | 2/2008 | Baldwin |
| 7,380,025 B1 | 5/2008 | Riggins |
| 7,430,164 B2 | 9/2008 | Bare |
| 7,453,888 B2 | 11/2008 | Zabihi |
| 7,477,894 B1 | 1/2009 | Sinha |
| 7,480,258 B1 | 1/2009 | Shuen |
| 7,508,757 B2 | 3/2009 | Ge |
| 7,558,195 B1 | 7/2009 | Kuo |
| 7,558,273 B1 | 7/2009 | Grosser, Jr. |
| 7,571,447 B2 | 8/2009 | Ally |
| 7,599,901 B2 | 10/2009 | Mital |
| 7,688,960 B1 | 3/2010 | Aubuchon |
| 7,690,040 B2 | 3/2010 | Frattura |
| 7,716,370 B1 | 5/2010 | Devarapalli |
| 7,729,296 B1 | 6/2010 | Choudhary |
| 7,787,480 B1 | 8/2010 | Mehta |
| 7,792,920 B2 | 9/2010 | Istvan |
| 7,796,593 B1 | 9/2010 | Ghosh |
| 7,808,992 B2 | 10/2010 | Homchaudhuri |
| 7,836,332 B2 | 11/2010 | Hara |
| 7,843,907 B1 | 11/2010 | Abou-Emara |
| 7,860,097 B1 | 12/2010 | Lovett |
| 7,898,959 B1 | 3/2011 | Arad |
| 7,924,837 B1 | 4/2011 | Shabtay |
| 7,937,756 B2 | 5/2011 | Kay |
| 7,949,638 B1 | 5/2011 | Goodson |
| 7,957,386 B1 | 6/2011 | Aggarwal |
| 8,027,354 B1 | 9/2011 | Portolani |
| 8,054,832 B1 | 11/2011 | Shukla |
| 8,078,704 B2 | 12/2011 | Lee |
| 8,102,781 B2 | 1/2012 | Smith |
| 8,116,307 B1 | 2/2012 | Thesayi |
| 8,125,928 B2 | 2/2012 | Mehta |
| 8,134,922 B2 | 3/2012 | Elangovan |
| 8,155,150 B1 | 4/2012 | Chung |
| 8,160,063 B2 | 4/2012 | Maltz |
| 8,160,080 B1 | 4/2012 | Arad |
| 8,170,038 B2 | 5/2012 | Belanger |
| 8,194,674 B1 | 6/2012 | Pagel |
| 8,195,774 B2 | 6/2012 | Lambeth |
| 8,213,313 B1 | 7/2012 | Doiron |
| 8,213,336 B2 | 7/2012 | Smith |
| 8,230,069 B2 | 7/2012 | Korupolu |
| 8,239,960 B2 | 8/2012 | Frattura |
| 8,249,069 B2 | 8/2012 | Raman |
| 8,270,401 B1 | 9/2012 | Barnes |
| 8,295,291 B1 | 10/2012 | Ramanathan |
| 8,301,686 B1 | 10/2012 | Appajodu |
| 8,351,352 B1 | 1/2013 | Eastlake, III |
| 8,369,347 B2 | 2/2013 | Xiong |
| 8,392,496 B2 | 3/2013 | Linden |
| 8,462,774 B2 | 6/2013 | Page et al. |
| 8,520,595 B2 | 8/2013 | Yadav |
| 8,599,850 B2 | 12/2013 | Jha |
| 2002/0021701 A1 | 2/2002 | Lavian |
| 2002/0091795 A1 | 7/2002 | Yip |
| 2003/0041085 A1 | 2/2003 | Sato |
| 2003/0123393 A1 | 7/2003 | Feuerstraeter |
| 2003/0174706 A1 | 9/2003 | Shankar |
| 2003/0189905 A1 | 10/2003 | Lee |
| 2004/0001433 A1 | 1/2004 | Gram |
| 2004/0010600 A1 | 1/2004 | Baldwin |
| 2004/0117508 A1 | 6/2004 | Shimizu |
| 2004/0120326 A1 | 6/2004 | Yoon |
| 2004/0165595 A1* | 8/2004 | Holmgren et al. ......... 370/395.3 |
| 2004/0213232 A1 | 10/2004 | Regan |
| 2005/0007951 A1 | 1/2005 | Lapuh |
| 2005/0044199 A1 | 2/2005 | Shiga |
| 2005/0094568 A1 | 5/2005 | Judd |
| 2005/0094630 A1 | 5/2005 | Valdevit |
| 2005/0122979 A1 | 6/2005 | Gross |
| 2005/0169188 A1 | 8/2005 | Cometto |
| 2005/0195813 A1 | 9/2005 | Ambe |
| 2005/0213561 A1 | 9/2005 | Yao |
| 2005/0265356 A1 | 12/2005 | Kawarai |
| 2005/0278565 A1 | 12/2005 | Frattura |
| 2006/0018302 A1 | 1/2006 | Ivaldi |
| 2006/0059163 A1 | 3/2006 | Frattura |
| 2006/0062187 A1 | 3/2006 | Rune |
| 2006/0072550 A1 | 4/2006 | Davis |
| 2006/0083254 A1 | 4/2006 | Ge |
| 2006/0184937 A1 | 8/2006 | Abels |
| 2006/0221960 A1 | 10/2006 | Borgione |
| 2006/0235995 A1 | 10/2006 | Bhatia |
| 2006/0242311 A1 | 10/2006 | Mai |
| 2006/0251067 A1 | 11/2006 | DeSanti |
| 2006/0256767 A1 | 11/2006 | Suzuki |
| 2006/0265515 A1 | 11/2006 | Shiga |
| 2006/0285499 A1 | 12/2006 | Tzeng |
| 2007/0036178 A1 | 2/2007 | Hares |
| 2007/0097968 A1 | 5/2007 | Du |
| 2007/0116224 A1 | 5/2007 | Burke |
| 2007/0177597 A1 | 8/2007 | Ju |
| 2007/0274234 A1 | 11/2007 | Kubota |
| 2007/0289017 A1 | 12/2007 | Copeland, III |
| 2008/0052487 A1 | 2/2008 | Akahane |
| 2008/0065760 A1* | 3/2008 | Damm et al. ................. 709/224 |
| 2008/0080517 A1 | 4/2008 | Roy |
| 2008/0101386 A1 | 5/2008 | Gray |
| 2008/0133760 A1 | 6/2008 | Berkvens et al. |
| 2008/0159277 A1 | 7/2008 | Vobbilisetty |
| 2008/0172492 A1 | 7/2008 | Raghunath |
| 2008/0186981 A1 | 8/2008 | Seto |
| 2008/0205377 A1 | 8/2008 | Chao |
| 2008/0219172 A1* | 9/2008 | Mohan et al. ............... 370/241.1 |
| 2008/0225853 A1 | 9/2008 | Melman |
| 2008/0240129 A1 | 10/2008 | Elmeleegy |
| 2008/0267179 A1 | 10/2008 | LaVigne et al. |
| 2008/0285555 A1 | 11/2008 | Ogasahara |
| 2008/0298248 A1 | 12/2008 | Roeck |
| 2009/0037607 A1 | 2/2009 | Farinacci |
| 2009/0044270 A1 | 2/2009 | Shelly |
| 2009/0067422 A1 | 3/2009 | Poppe |
| 2009/0079560 A1 | 3/2009 | Fries |
| 2009/0080345 A1 | 3/2009 | Gray |
| 2009/0083445 A1 | 3/2009 | Ganga |
| 2009/0092042 A1 | 4/2009 | Yuhara |
| 2009/0106405 A1 | 4/2009 | Mazarick |
| 2009/0116381 A1 | 5/2009 | Kanda |
| 2009/0138752 A1 | 5/2009 | Graham |
| 2009/0199177 A1 | 8/2009 | Edwards |
| 2009/0204965 A1 | 8/2009 | Tanaka |
| 2009/0222879 A1 | 9/2009 | Kostal |
| 2009/0245137 A1 | 10/2009 | Hares |
| 2009/0245242 A1 | 10/2009 | Carlson |
| 2009/0260083 A1 | 10/2009 | Szeto |
| 2009/0323708 A1 | 12/2009 | Ihle |
| 2009/0327392 A1 | 12/2009 | Tripathi |
| 2009/0327462 A1 | 12/2009 | Adams |
| 2010/0054260 A1 | 3/2010 | Pandey |
| 2010/0061269 A1 | 3/2010 | Banerjee |
| 2010/0074175 A1 | 3/2010 | Banks |
| 2010/0097941 A1 | 4/2010 | Carlson |
| 2010/0103813 A1 | 4/2010 | Allan |
| 2010/0103939 A1 | 4/2010 | Carlson |
| 2010/0131636 A1 | 5/2010 | Suri |
| 2010/0158024 A1 | 6/2010 | Sajassi |

(56) References Cited

U.S. PATENT DOCUMENTS

| | | | |
|---|---|---|---|
| 2010/0165877 A1 | 7/2010 | Shukla |
| 2010/0165995 A1 | 7/2010 | Mehta |
| 2010/0169467 A1 | 7/2010 | Shukla |
| 2010/0169948 A1 | 7/2010 | Budko |
| 2010/0226381 A1 | 9/2010 | Mehta |
| 2010/0246388 A1 | 9/2010 | Gupta |
| 2010/0257263 A1 | 10/2010 | Casado |
| 2010/0271960 A1 | 10/2010 | Krygowski |
| 2010/0281106 A1 | 11/2010 | Ashwood-Smith |
| 2010/0284418 A1 | 11/2010 | Gray |
| 2010/0287262 A1 | 11/2010 | Elzur |
| 2010/0287548 A1 | 11/2010 | Zhou |
| 2010/0290473 A1 | 11/2010 | Enduri |
| 2010/0303071 A1 | 12/2010 | Kotalwar |
| 2010/0303075 A1 | 12/2010 | Tripathi |
| 2010/0303083 A1 | 12/2010 | Belanger |
| 2010/0309820 A1 | 12/2010 | Rajagopalan |
| 2011/0019678 A1 | 1/2011 | Mehta |
| 2011/0035498 A1 | 2/2011 | Shah |
| 2011/0044339 A1 | 2/2011 | Kotalwar |
| 2011/0064086 A1 | 3/2011 | Xiong |
| 2011/0072208 A1 | 3/2011 | Gulati |
| 2011/0085560 A1 | 4/2011 | Chawla |
| 2011/0085563 A1 | 4/2011 | Kotha |
| 2011/0134802 A1 | 6/2011 | Rajagopalan |
| 2011/0134925 A1 | 6/2011 | Safrai |
| 2011/0142053 A1 | 6/2011 | Van Der Merwe et al. |
| 2011/0142062 A1 | 6/2011 | Wang |
| 2011/0161695 A1 | 6/2011 | Okita |
| 2011/0194403 A1* | 8/2011 | Sajassi et al. | 370/217 |
| 2011/0194563 A1 | 8/2011 | Shen |
| 2011/0228780 A1 | 9/2011 | Ashwood-Smith |
| 2011/0231574 A1 | 9/2011 | Saunderson |
| 2011/0235523 A1 | 9/2011 | Jha |
| 2011/0243133 A9 | 10/2011 | Villait |
| 2011/0243136 A1 | 10/2011 | Raman |
| 2011/0246669 A1 | 10/2011 | Kanada |
| 2011/0255538 A1 | 10/2011 | Srinivasan |
| 2011/0255540 A1 | 10/2011 | Mizrahi |
| 2011/0261828 A1 | 10/2011 | Smith |
| 2011/0268120 A1 | 11/2011 | Vobbilisetty |
| 2011/0274114 A1 | 11/2011 | Dhar |
| 2011/0286457 A1 | 11/2011 | Ee |
| 2011/0296052 A1 | 12/2011 | Guo |
| 2011/0299391 A1 | 12/2011 | Vobbilisetty |
| 2011/0299414 A1 | 12/2011 | Yu |
| 2011/0299527 A1 | 12/2011 | Yu |
| 2011/0299528 A1 | 12/2011 | Yu |
| 2011/0299531 A1 | 12/2011 | Yu |
| 2011/0299532 A1 | 12/2011 | Yu |
| 2011/0299533 A1 | 12/2011 | Yu |
| 2011/0299536 A1 | 12/2011 | Cheng |
| 2012/0011240 A1 | 1/2012 | Hara |
| 2012/0014261 A1 | 1/2012 | Salam |
| 2012/0014387 A1 | 1/2012 | Dumbar |
| 2012/0027017 A1 | 2/2012 | Rai |
| 2012/0033663 A1 | 2/2012 | Guichard |
| 2012/0033665 A1 | 2/2012 | Da Silva et al. |
| 2012/0099602 A1 | 4/2012 | Nagapudi |
| 2012/0106339 A1 | 5/2012 | Mishra |
| 2012/0131097 A1 | 5/2012 | Baykal |
| 2012/0131289 A1 | 5/2012 | Taguchi |
| 2012/0163164 A1 | 6/2012 | Terry |
| 2012/0177039 A1 | 7/2012 | Berman |
| 2012/0243539 A1 | 9/2012 | Keesara |
| 2012/0294192 A1 | 11/2012 | Masood |
| 2012/0320800 A1 | 12/2012 | Kamble |
| 2013/0034015 A1 | 2/2013 | Jaiswal |
| 2013/0067466 A1 | 3/2013 | Combs |
| 2013/0259037 A1 | 10/2013 | Natarajan |
| 2014/0105034 A1 | 4/2014 | Sun |

OTHER PUBLICATIONS

Foundary FastIron Configuration Guide, Software Release FSX 04.2.00b, Software Release FWS 04.3.00, Software Release FGS 05.0.00a, Sep. 2008.

Brocade, "FastIron and TurboIron 24x Configuration Guide", Feb. 16, 2010.

Brocade, "FastIron Configuration Guide" Dec. 18, 2009.

Narten, T. et al., "Problem Statement: Overlays for Network Virtualization draft-narten-nvo3-overlay-problem-statement-01", Oct. 31, 2011.

Knight, Paul et al., "Layer 2 and 3 Virtual Private Networks: Taxonomy, Technology, and Standardization Efforts", Jun. 2004.

Brocade "An Introduction to Brocade VCS Fabric Technology", Dec. 3, 2012.

Kreeger, L. et al., "Network Virtualization Overlay Control Protocol Requirements draft-kreeger-nvo3-overlay-cp-00", Jan. 30, 2012.

Knight, Paul et al., "Network Based IP VPN Architecture using Virtual Routers", May 2003.

Louati, Wajdi et al., "Network-Based Virtual Personal Overlay Networks Using Programmable Virtual Routers", Jul. 2005.

Office Action for U.S. Appl. No. 12/725,249, filed Mar. 16, 2010, dated Sep. 12, 2012.

Office Action for U.S. Appl. No. 12/725,249, filed Mar. 16, 2010, dated Apr. 26, 2013.

Office Action for U.S. Appl. No. 13/087,239, filed Apr. 14, 2011, dated Dec. 5, 2012.

Office Action for U.S. Appl. No. 13/087,239, filed Apr. 14, 2011, dated May 22, 2013.

Office Action for U.S. Appl. No. 13/098,490, filed May 2, 2011, dated Dec. 21, 2012.

Office Action for U.S. Appl. No. 13/098,490, filed May 2, 2011, from Wyllie, Christopher T., dated Jul. 9, 2013.

Office Action for U.S. Appl. No. 13/092,724, filed Apr. 22, 2011, from Park, Jung H., dated Feb. 5, 2013.

Office Action for U.S. Appl. No. 13/092,724, filed Apr. 22, 2011, from Park, Jung H., dated Jul. 16, 2013.

Office Action for U.S. Appl. No. 13/092,580, filed Apr. 22, 2011, from Kavleski, Ryan C., dated Jun. 10, 2013.

Office Action for U.S. Appl. No. 13/042,259, filed Mar. 7, 2011, from Jaroenchonwanit, Bunjob, dated Mar. 18, 2013.

Office Action for U.S. Appl. No. 13/092,460, filed Apr. 22, 2011, from Chang, Richard K., dated Jun. 21, 2013.

Office Action for U.S. Appl. No. 13/042,259, filed Mar. 7, 2011, from Jaroenchonwanit, Bunjob, dated Jul. 31, 2013.

Office Action for U.S. Appl. No. 13/092,701, filed Apr. 22, 2011, from Park, Jung H., dated Jan. 28, 2013.

Office Action for U.S. Appl. No. 13/092,701, filed Apr. 22, 2011, from Park, Jung H., dated Jul. 3, 2013.

Office Action for U.S. Appl. No. 13/092,752, filed Apr. 22, 2011, from Park, Jung H., dated Feb. 5, 2013.

Office Action for U.S. Appl. No. 13/092,752, filed Apr. 22, 2011, from Park, Jung H., dated Jul. 18, 2013.

Office Action for U.S. Appl. No. 13/950,974, filed Nov. 19, 2010, from Haile, Awet A., dated Dec. 2, 2012.

Office Action for U.S. Appl. No. 12/950,974, filed Nov. 19, 2010, from Haile, Awet A., dated May 24, 2012.

Office Action for U.S. Appl. No. 13/092,877, filed Apr. 22, 2011, from Patel, Parthkumar, dated Mar. 4, 2013.

Office Action for U.S. Appl. No. 13/092,877, filed Apr. 22, 2011, from Patel, Parthkumar, dated Sep. 5, 2013.

Office Action for U.S. Appl. No. 12/950,968, filed Nov. 19, 2010, from Haile, Awet A., dated Jun. 7, 2012.

Office Action for U.S. Appl. No. 12/950,968, filed Nov. 19, 2010, from Haile, Awet A., dated Jan. 4, 2013.

Office Action for U.S. Appl. No. 13/092,864, filed Apr. 22, 2011, from Huang, Weibin, dated Sep. 19, 2012.

Office Action for U.S. Appl. No. 13/098,360, filed Apr. 29, 2011, from Lo, Diane Lee, dated May 31, 2013.

Office Action for U.S. Appl. No. 13/044,326, filed Mar. 9, 2011, from Ghafoerkhan, Faiyazkhan, dated Oct. 2, 2013.

(56) References Cited

OTHER PUBLICATIONS

Office Action for U.S. Appl. No. 13/030,806, filed Feb. 18, 2011, from Ambaye, Mewale A., dated Dec. 3, 2012.
Office Action for U.S. Appl. No. 13/030,806, filed Feb. 18, 2011, from Ambaye, Mewale A., dated Jun. 11, 2013.
Office Action for U.S. Appl. No. 13/030,688, filed Feb. 18, 2011, from Mansoury, Nourali, dated Apr. 25, 2013.
Office Action for U.S. Appl. No. 13/044,301, filed Mar. 9, 2011, from Weidner, Timothy J., dated Jun. 11, 2013.
Office Action for U.S. Appl. No. 13/044,301, filed Mar. 9, 2011, from Weidner, Timothy J., dated Feb. 22, 2013.
Office Action for U.S. Appl. No. 13/050,102, filed Mar. 17, 2011, from Preval, Lionel, dated Oct. 26, 2012.
Office Action for U.S. Appl. No. 13/050,102, filed Mar. 17, 2011, from Preval, Lionel, dated May 16, 2013.
Office Action for U.S. Appl. No. 13/184,526, filed Jul. 16, 2011, from Vu, Viet Duy, dated Jan. 28, 2013.
Office Action for U.S. Appl. No. 13/184,526, filed Jul. 16, 2011, from Vu, Viet Duy, dated May 22, 2013.
Office Action for U.S. Appl. No. 13/092,873, filed Apr. 22, 2011, from Patel, Parthkumar, dated Jun. 19, 2013.
Office Action for U.S. Appl. No. 13/365,993, filed Feb. 3, 2012, from Cho, Hong Sol., dated Jul. 23, 2013.
Office Action for U.S. Appl. No. 13/365,808, filed Feb. 3, 2012, from Cho, Hong Sol., dated Jul. 18, 2013.
Office Action for U.S. Appl. No. 13/312,903, filed Dec. 6, 2011, from Qin, Zhiren, dated Jun. 13, 2013.
Office Action for U.S. Appl. No. 13/533,843, filed Jun. 26, 2012, from Lee, Chi Ho A., dated Oct. 21, 2013.
Office Action for U.S. Appl. No. 13/312,903, filed Dec. 6, 2011, from Qin, Zhiren, dated Nov. 12, 2013.
Office Action for U.S. Appl. No. 13/092,873, filed Apr. 22, 2011, from Patel, Parthkumar, dated Nov. 29, 2013.
Office Action for U.S. Appl. No. 13/184,526, filed Jul. 16, 2011, from Vu, Viet Duy, dated Dec. 2, 2013.
Office Action for U.S. Appl. No. 13/042,259, filed Mar. 7, 2011, from Jaroenchonwanit, Bunjob, dated Jan. 16, 2014.
Office Action for U.S. Appl. No. 13/092,580, filed Apr. 22, 2011, from Kavleski, Ryan C., dated Jan. 10, 2014.
Office Action for U.S. Appl. No. 13/092,877, filed Apr. 22, 2011, from Patel, Parthkumar, dated Jan. 6, 2014.
"Switched Virtual Internetworking moves beyond bridges and routers", 8178 Data Communications 23(Sep. 1994), No. 12, New York, pp. 66-70, 72, 74, 76, 78, 80.
Perlman, Radia et al., "RBridge VLAN Mapping", Dec. 4, 2003.
Perlman, Radia et al., "Challenges and Opportunities in the Design of TRILL: a Routed layer 2 Technology", 2009.
S. Nada, ED et al., "Virtual Router Redundancy Protocol (VRRP) Version 3 for IPv4 and IPv6", Mar. 2010.
Lapuh, Roger et al., "Split Multi-link Trunking (SMLT)", Oct. 2002.
Knight, S. et al., "Virtual Router Redundancy Protocol", Apr. 1998.
Eastlake 3rd., Donald et al., "RBridges: TRILL Header Options", <draft-ietf-trill-rbridge-options-00.txt>, Dec. 2009.
Lapuh, Roger et al., "Split Multi-link Trunking (SMLT)", draft-lapuh-network-smlt-08, Jul. 2008.
Touch, J. et al., "Transparent Interconnection of Lots of Links (TRILL): Problem and Applicability Statement", May 2009.
Christensen, M. et al., "Considerations for Internet Group Management Protocol (IGMP) and Multicast Listener Discovery (MLD) Snooping Switches", May 2006.
Office Action for U.S. Appl. No. 13/669,357, filed Nov. 5, 2012, dated Jun. 6, 2014.
Office Action for U.S. Appl. No. 13/533,843, filed Jun. 26, 2012, dated May 14, 2014.
Office Action for U.S. Appl. No. 13/484,072, filed May 30, 2012, dated May 9, 2014.
Office Action for U.S. Appl. No. 13/351,513, filed Jan. 17, 2012, dated Feb. 28, 2014.
Office Action for U.S. Appl. No. 13/425,238, filed Mar. 20, 2012, dated Mar. 6, 2014.
Office Action for U.S. Appl. No. 13/030,806, filed Feb. 18, 2011, dated Apr. 22, 2014.
Office Action for U.S. Appl. No. 13/092,752, filed Apr. 22, 2011, dated Apr. 9, 2014.
Office Action for U.S. Appl. No. 13/092,701, filed Apr. 22, 2011, dated Mar. 26, 2014.
Office Action for U.S. Appl. No. 13/092,460, filed Apr. 22, 2011, dated Mar. 14, 2014.
Office Action for U.S. Appl. No. 13/092,724, filed Apr. 22, 2011, dated Apr. 9, 2014.
Office Action for U.S. Appl. No. 13/098,490, filed May 2, 2011, dated Mar. 27, 2014.
Office Action for U.S. Appl. No. 13/598,204, filed Aug. 29, 2012, dated Feb. 20, 2014.
Zhai F. Hu et al. "RBridge: Pseudo-Nickname; draft-hu-trill-pseudonode-nickname-02.txt", May 15, 2012.
Huang, Nen-Fu et al., "An Effective Spanning Tree Algorithm for a Bridged LAN", Mar. 16, 1992.
Office Action dated Jun. 6, 2014, U.S. Appl. No. 13/669,357, filed Nov. 5, 2012.
Office Action dated Feb. 20, 2014, U.S. Appl. No. 13/598,204, filed Aug. 29, 2012.
Office Action dated May 14, 2014, U.S. Appl. No. 13/533,843, filed Jun. 26, 2012.
Office Action dated May 9, 2014, U.S. Appl. No. 13/484,072, filed May 30, 2012.
Office Action dated Feb. 28, 2014, U.S. Appl. No. 13/351,513, filed Jan. 17, 2012.
Office Action dated Jun. 18, 2014, U.S. Appl. No. 13/440,861, filed Apr. 5, 2012.
Office Action dated Mar. 6, 2014, U.S. Appl. No. 13/425,238, filed Mar. 20, 2012.
Office Action dated Apr. 22, 2014, U.S. Appl. No. 13/030,806, filed Feb. 18, 2011.
Office Action dated Jun. 20, 2014, U.S. Appl. No. 13/092,877, filed Apr. 22, 2011.
Office Action dated Apr. 9, 2014, U.S. Appl. No. 13/092,752, filed Apr. 22, 2011.
Office Action dated Mar. 26, 2014, U.S. Appl. No. 13/092,701, filed Apr. 22, 2011.
Office Action dated Mar. 14, 2014, U.S. Appl. No. 13/092,460, filed Apr. 22, 2011.
Office Action dated Apr. 9, 2014, U.S. Appl. No. 13/092,724, filed Apr. 22, 2011.

* cited by examiner

| FIELDS | OCTETS |
|---|---|
| Outer Ethernet Header | |
| Outer MAC DA | 6 |
| Outer MAC SA | 6 |
| Outer VLAN tag | 4 |
| Ethertype = TRILL | 2 |
| TRILL Header | |
| V \| R \| M \| OL \| HC | 2 |
| Egress RBridge Nickname | 2 |
| Ingress RBridge Nickname | 2 |
| Inner Ethernet Header | |
| Inner MAC DA | 6 |
| Inner MAC SA | 6 |
| Inner VLAN tag | 4 |
| Ethertype = TOAM | 2 |
| TRILL OAM | |
| TOAM Header | |
| Payload | Variable |
| Frame Check Sequence (FCS) | 4 |

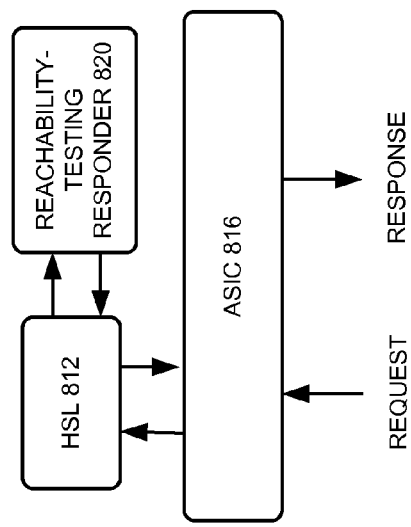
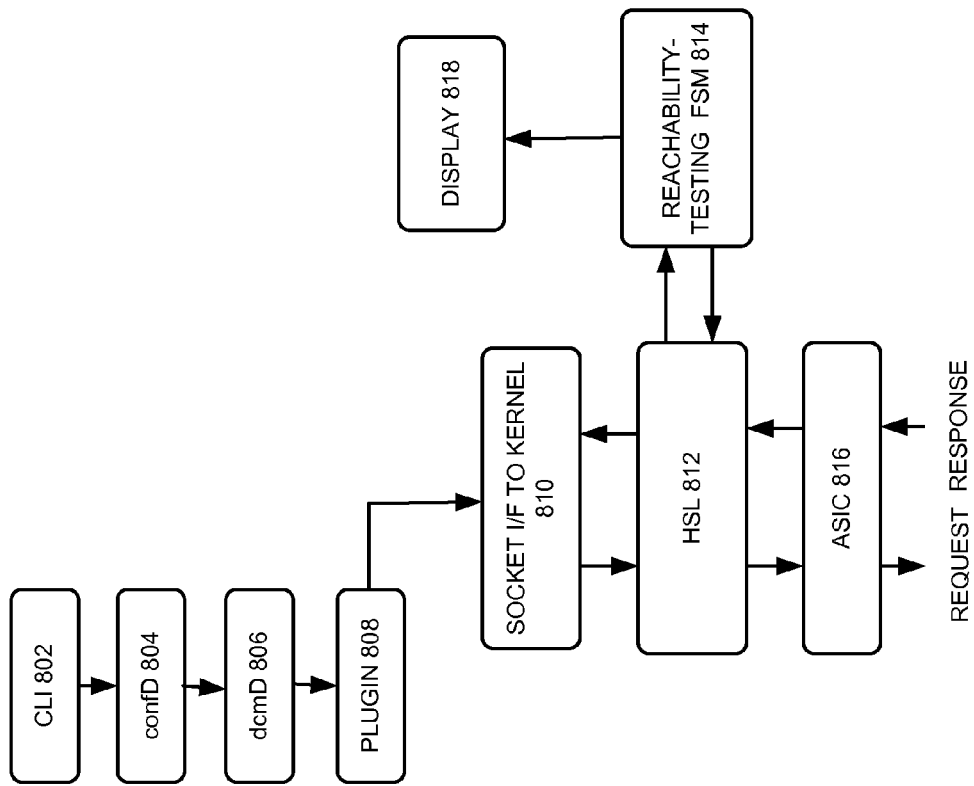
FIG. 8B
FIG. 8A

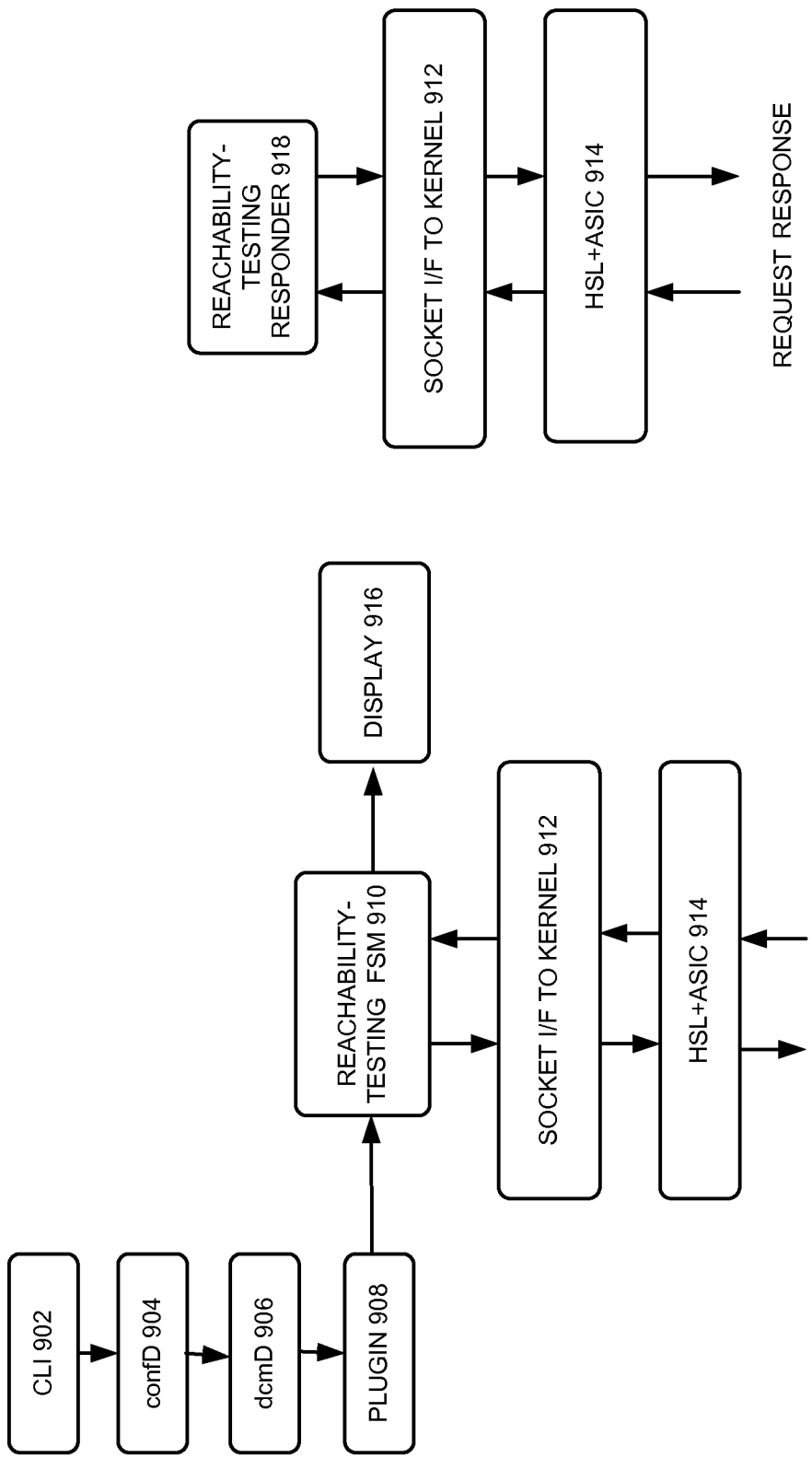

REACHABILITY DETECTION IN TRILL NETWORKS

RELATED APPLICATIONS

This application claims the benefit of U.S. Provisional Application No. 61/350,827, entitled "Reachability Detection in TRILL Networks," by inventors Suresh Vobbilisetty, Phanidhar Koganti, and Arun Mahajan, filed 2 Jun. 2010, and U.S. Provisional Application No. 61/380,814, entitled "Reachability Detection in TRILL Networks," by inventors Suresh Vobbilisetty, Phanidhar Koganti, and Arun Mahajan, filed 8 Sep. 2010, the disclosures of which are incorporated by reference herein.

The present disclosure is related to U.S. patent application Ser. No. 12/725,249, entitled "REDUNDANT HOST CONNECTION IN A ROUTED NETWORK," by inventors Somesh Gupta, Anoop Ghanwani, Phanidhar Koganti, and Shunjia Yu, filed 16 Mar. 2010;

U.S. patent application Ser. No. 12/730,749, entitled "METHOD AND SYSTEM FOR EXTENDING ROUTING DOMAIN TO NON-ROUTING END STATIONS," by inventors Pankaj K. Jha and Mitri Halabi, filed 24 Mar. 2010; and U.S. patent application Ser. No. 13/087,239, entitled "VIRTUAL CLUSTER SWITCHING," by inventors Suresh Vobbilisetty and Dilip Chatwani, filed Apr. 14, 2011.

the disclosures of which are incorporated by reference herein.

BACKGROUND

1. Field

The present disclosure relates to network monitoring and troubleshooting. More specifically, the present disclosure relates to a method for detecting reachability in a network implementing the Transparent Interconnection of Lots of Links (TRILL) protocol.

2. Related Art

As more mission-critical applications are being implemented in data communication networks, high-availability operation is becoming progressively more important as a value proposition for network architects. It is often desirable to divide a conventional aggregated link (from one device to another) among multiple network devices, such that a node failure or link failure would not affect the operation of the multi-homed device.

Meanwhile, layer-2 (e.g., Ethernet) networking technologies continue to evolve. More routing-like functionalities, which have traditionally been the characteristics of layer-3 (e.g., IP) networks, are migrating into layer-2. Notably, the recent development of the Transparent Interconnection of Lots of Links (TRILL) protocol allows Ethernet switches to function more like routing devices. TRILL overcomes the inherent inefficiency of the conventional spanning tree protocol, which forces layer-2 switches to be coupled in a logical spanning-tree topology to avoid looping. TRILL allows routing bridges (RBridges) to be coupled in an arbitrary topology without the risk of looping by implementing routing functions in switches and including a hop count in the TRILL header. Like any other type of network, a TRILL network needs to be monitored and maintained to ensure its proper operation. However, at present, TRILL networks lack many of the network control and management functions available in layer-3 networks.

SUMMARY

One embodiment of the present invention provides a system for testing reachability between two nodes within a network. During operation, the system transmits a network-testing request frame from a source node to a destination node, and in response to receiving a network-testing response frame corresponding to the request frame, the system determines reachability of the destination node. The network-testing request or response frame is not processed on an Internet Protocol (IP) layer.

In a variation on this embodiment, the network-testing request or response frame includes an Ethernet frame.

In a further variation, the Ethernet frame includes a field which indicates that the Ethernet frame is an Operation, Administration, and Management (OAM) frame.

In a variation on this embodiment, the system further executes a network-testing command which includes an address of the destination node.

In a variation on this embodiment, the network-testing request or response frame is a Transparent Interconnection of Lots of Links (TRILL) frame.

In a further variation, the network-testing request or response frame includes TRILL headers comprising the address of the destination node in an outer media access control (MAC) destination address (DA) field.

In a further variation, the network-testing request or response frame includes TRILL headers and an encapsulated Ethernet frame, and the Ethertype field of the encapsulated Ethernet frame specifies that the network-testing request frame is a TRILL OAM frame.

In a further variation, the encapsulated Ethernet frame includes a TRILL OAM header field.

In a further variation, the TRILL OAM header field includes an operation code (opcode) field, and wherein the opcode field specifies whether a TRILL OAM frame is a request or response frame.

In a further variation, the TRILL OAM header field includes a transaction identifier, and a network-testing request frame and a corresponding response frame have the same transaction identifier.

In a variation on this embodiment, the system further determines a round trip time between the time when the network-testing request frame is transmitted and the time when the response frame is received.

BRIEF DESCRIPTION OF THE FIGURES

FIG. 3 presents a diagram illustrating the format of an exemplary TRILL PDU used for Operations, Administration, and Maintenance (OAM) purposes in accordance with an embodiment of the present invention.

FIG. 8A presents a diagram illustrating the detailed flow of the reachability-testing request and response packets within a TRILL network node that initializes the reachability test in accordance with an embodiment of the present invention.

FIG. 8B presents a diagram illustrating the detailed flow of the reachability-testing request and response packets within a TRILL network node that responds to the reachability test in accordance with an embodiment of the present invention.

FIG. 9A presents a diagram illustrating the detailed flow of the reachability-testing request and response packets within a TRILL network node that initializes the reachability test in accordance with an embodiment of the present invention.

FIG. 9B presents a diagram illustrating the detailed flow of the reachability-testing request and response packets within a TRILL network node that responds to the reachability test in accordance with an embodiment of the present invention.

In the figures, like reference numerals refer to the same figure elements.

DETAILED DESCRIPTION

Figure 1:
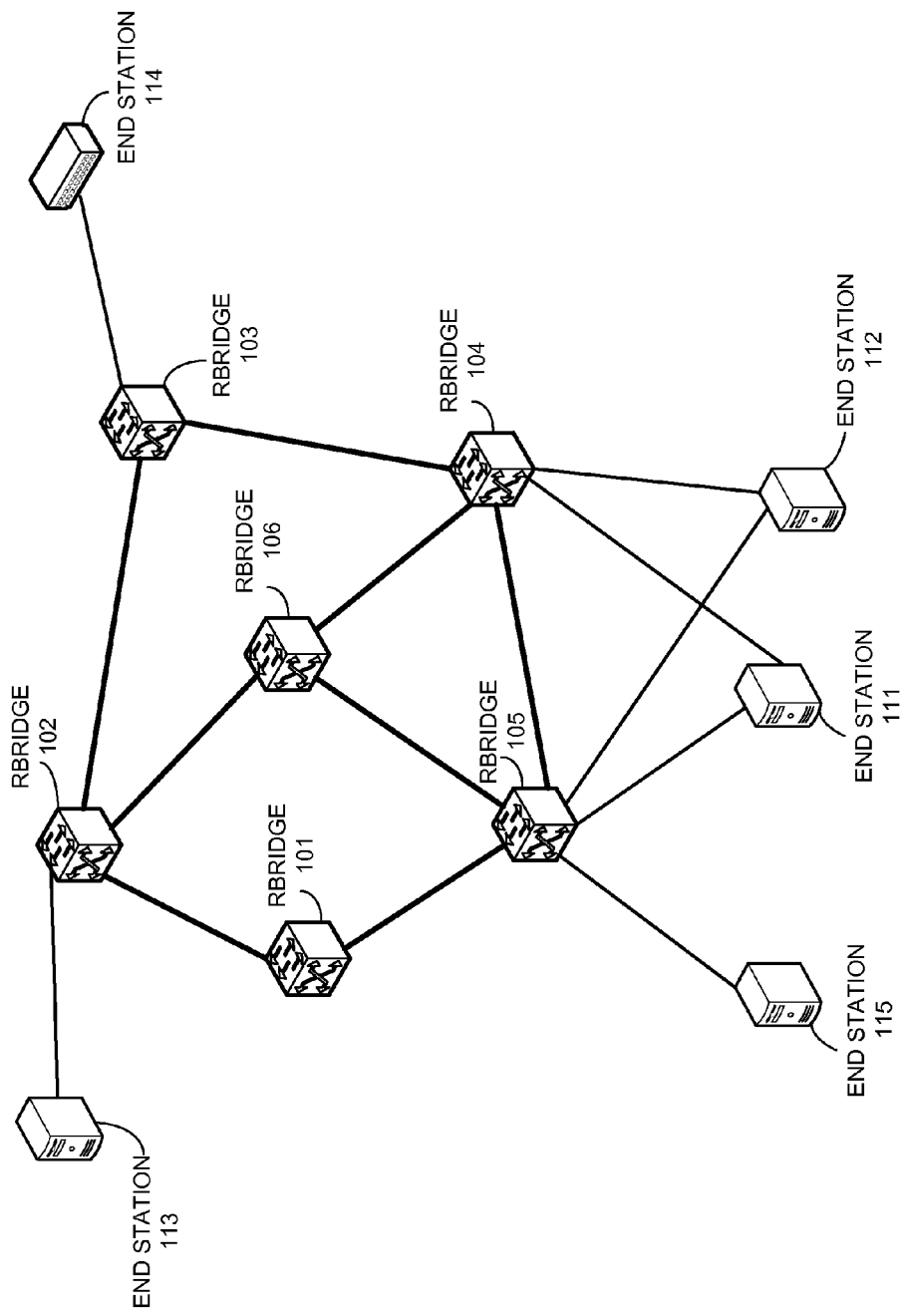
FIG. 1 illustrates an exemplary TRILL network (prior art).

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of testing reachability between two TRILL nodes is solved by allowing a source node to send a reachability-test request packet to the destination node and determining whether a response packet from the destination node is received. The reachability-testing packet includes an optional source TRILL address, a destination TRILL address, and a transaction identifier which is incremented each time such a packet is sent. The transaction identifier can associate a response packet with a request packet. After receiving a valid request, the destination node converts the request packet into a response packet while keeping the same transaction identifier, and sends it back to the source node. Upon receiving a valid response that matches an outstanding request, the initiator of the reachability testing displays the successful arrival of the response, and identifies the destination along with the round trip time in the display.

Although the present disclosure is presented using examples based on the TRILL protocol, embodiments of the present invention are not limited to TRILL networks, or networks defined in a particular Open System Interconnection Reference Model (OSI reference model) layer.

In this disclosure, the term "RBridge" refers to routing bridges, which are bridges implementing the TRILL protocol as described in IETF draft "RBridges: Base Protocol Specification," available at http://tools.ietf.org/html/draft-ietf-trill-rbridge-protocol-16, which is incorporated by reference herein. Embodiments of the present invention are not limited to the application among RBridges. Other types of switches, routers, and forwarders can also be used.

The term "end station" refers to a network device that is not TRILL-capable. "End station" is a relative term with respect to the TRILL network. However, "end station" does not necessarily mean that the network device is an end host. An end station can be a host, a conventional layer-2 switch, an IP router, or any other type of network device. Additionally, an end station can be coupled to other switches, routers, or hosts further away from the TRILL network. In other words, an end station can be an aggregation point for a number of network devices to enter the TRILL network.

The term "dual-homed end station" refers to an end station that has an aggregate link to two or more TRILL RBridges, where the aggregate link includes multiple physical links to the different RBridges. The aggregate link, which includes multiple physical links, functions as one logical link to the end station. Although the term "dual" is used here, the term "dual-homed end station" does not limit the number of physical RBridges sharing the aggregate link to two. In various embodiments, other numbers of physical RBridges can share the same aggregate link. Where "dual-homed end station" is used in the present disclosure, the term "multi-homed end station" can also be used.

The terms "frame" or "packet" refer to a group of bits that can be transported together across a network. "Frame" should not be interpreted as limiting embodiments of the present invention to layer-2 networks. "Packet" should not be interpreted as limiting embodiments of the present invention to layer-3 networks. "Frame" or "packet" can be replaced by other terminologies referring to a group of bits, such as "cell" or "datagram."

OAM in TRILL Network

FIG. 1 illustrates an exemplary TRILL network (prior art). As illustrated in FIG. 1, a TRILL network includes six RBridges, 101, 102, 103, 104, 105, and 106. End station 113 is coupled to RBridge 102; end station 114 is coupled to RBridge 103; and end station 115 is coupled to RBridge 105. End stations 111 and 112 are both dual-homed and coupled to RBridges 104 and 105.

It is important to provide Operations, Administration, and Maintenance (OAM) services in a TRILL network. After the initialization of a TRILL network, a network administrator or a user may want to test the reachability between two RBridges within the network. However, unlike layer-3 (such as IP) networks for which a number of OAM protocols have been developed, there is no protocol available for implementing OAM in TRILL. To address such an issue, embodiments of the present invention provide a method and apparatus for implementing OAM in a TRILL environment.

Figure 2:
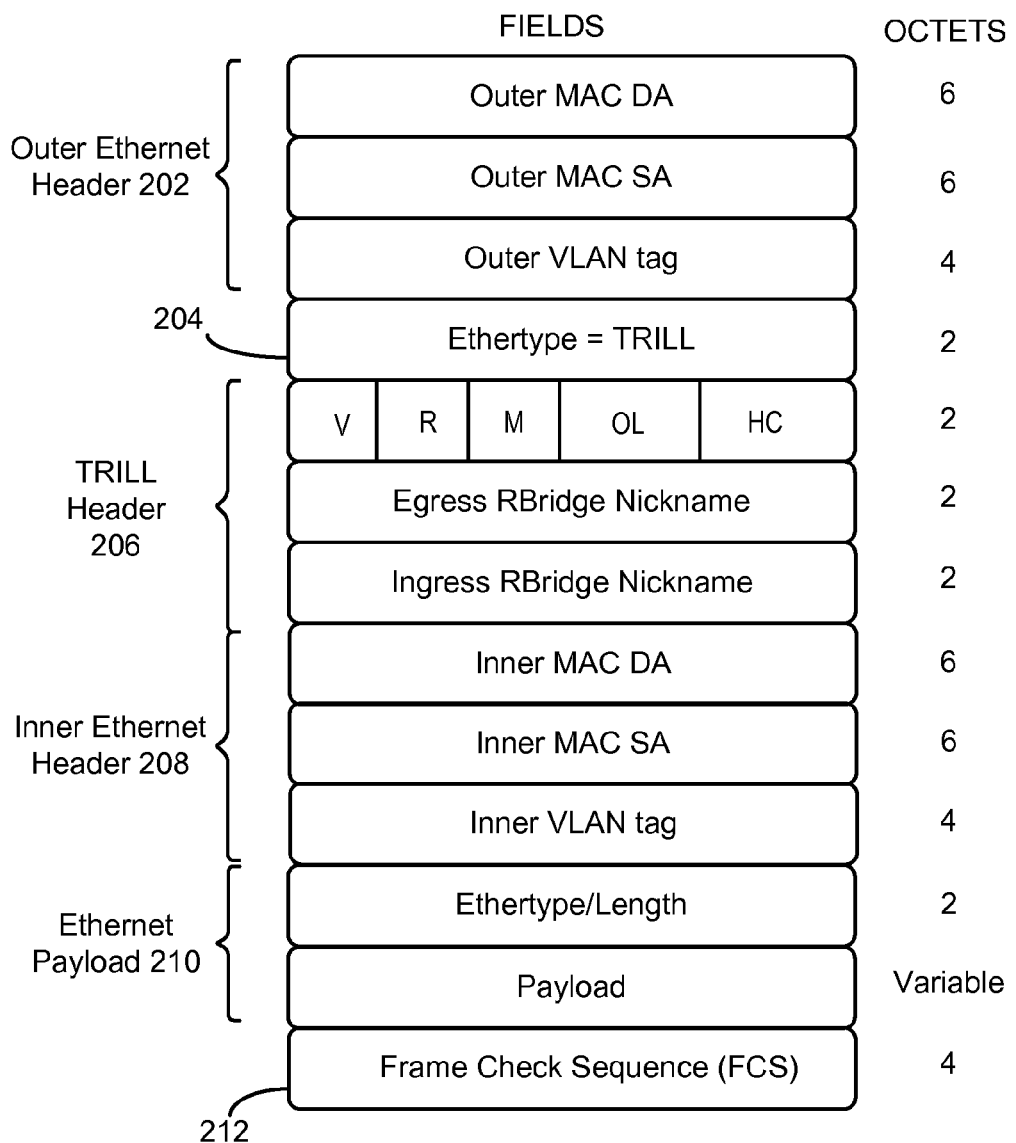
FIG. 2 presents a diagram illustrating the format of an exemplary protocol data unit (PDU) for the Transparent Interconnection of Lots of Links (TRILL) protocol (prior art).

Because each node within a TRILL network runs the TRILL protocol on its ports to facilitate transport of frames (which can be Ethernet or other types of frames) within and across the network, an OAM packet exchanged between the nodes also needs to conform to the TRILL protocol. FIG. 2 presents a diagram illustrating the format of an exemplary protocol data unit (PDU) for the Transparent Interconnection of Lots of Links (TRILL) protocol (prior art). For Ethernet-based TRILL, PDU 200 is an encapsulated Ethernet frame that includes an outer Ethernet header 202, a 2-byte Ethertype field 204, a TRILL header 206, an inner Ethernet header 208, an Ethernet payload 210, and a 4-byte frame check sequence (FCS) field 212.

Outer Ethernet header 202 includes a 6-byte outer MAC destination address (DA) field, a 6-byte outer MAC source address (SA) field, and a 4-byte outer virtual local area network (VLAN) tag field. The outer MAC DA field and the outer MAC SA field specify the next hop RBridge and the transmitting RBridge, respectively, and the outer VLAN tag includes an outer VLAN ID (specified by the designated RBridge for the link onto which the TRILL frame is being sent) and a priority field. Ethertype field 204 specifies that Ethertype is TRILL.

TRILL header 206 includes a 2-bit version (V) field, a 2-bit reserved (R) field, a 1-bit multi-destination (M) field, a 5-bit options length (OL) field, a 6-bit hop count (HC) field, a 2-byte egress RBridge nickname field, and a 2-byte ingress RBridge nickname field. The V field specifies the version of the TRILL-encapsulated frame. If an RBridge determines that the V field in a received TRILL frame has an unrecognized value, the RBridge can optionally discard that frame. The multi-destination field indicates whether the frame is to be delivered to a class of destination end stations via a distribution tree. The OL field specifies the length of an optional field, which indicates optional capabilities used by the TRILL frame, in units of 4 octets. If OL is zero, there are no options present. Otherwise, the options follow immediately after the ingress RBridge nickname field. The hop count field specifies the number of hops a TRILL frame has experienced. An RBridge decrements the hop count of a received frame, and drops frames received with a hop count of zero. The value of the egress Rbridge nickname field depends on the value of the M field. If M=0, the frame is a unicast frame, and the egress RBridge nickname field specifies the egress RBridge. If M=1, the frame is a multi-destination frame, and the egress RBridge nickname field contains a nickname specifying the distribution tree selected to be used to forward the frame.

Inner Ethernet header 206 includes a 6-byte inner MAC DA field, a 6-byte inner MAC SA field, and a 4-byte inner VLAN tag field. The inner MAC DA field and inner MAC SA field specify the destination and source, respectively, of the inner frame, and the inner VLAN tag field contains the VLAN tag information associated with the native frame when it was ingressed.

Ethernet payload 210 includes a 2-byte Ethertype/length field specifying the Ethertype of the original payload, and a variable-length original Ethernet payload field. FCS field 212 contains the computed FCS of the TRILL frame, which is used to detect frame corruptions due to bit errors on a link. Note that the FCS normally changes on encapsulation, decapsulation, and every TRILL hop due to changes in the outer DA and SA addresses and the decrement of the hop count.

To implement OAM in a TRILL network, embodiments of the present invention provide TRILL OAM packets that can be exchanged between two TRILL nodes, thus allowing a system administrator to check on continuity and reachability, and to measure the performance of the TRILL network. For example, in order to test the reachability between two nodes within a TRILL network, an OAM packet can be generated and transmitted from a node with a specified source MAC address to a node with a specified destination MAC address. After receiving such a packet, the destination node can return it to its initiator which facilitates measurement of the round trip time. A successful return (or response) of the OAM packet indicates a proper reachability between the source node and the destination node. Note that, although such an operation is similar to a ping operation used in an Internet Protocol (IP) network, an IP ping cannot be used in the TRILL environment because the IP ping relies on the sending and receiving of an Internet Control Message Protocol (ICMP) packet which is not compatible with TRILL. Furthermore, an IP ping command can only test reachability on the IP layer, which does not always reflect the reachability on the TRILL layer FIG. 3 presents a diagram illustrating the format of an exemplary TRILL PDU used for Operations, Administration, and Maintenance (OAM) purposes in accordance with an embodiment of the present invention. TRILL-OAM (TOAM) PDU 300 contains fields common to a TRILL PDU, including the outer Ethernet header, the TRILL header, the inner Ethernet header, and the FCS. In addition, the Ethertype/length field of the Ethernet payload within TRILL-OAM PDU 300 is set as TOAM to specify that the TRILL PDU is a TRILL-OAM PDU. The OAM-specific information is carried in the original Ethernet payload field, including a TOAM header field and a payload field.

Figure 4A:
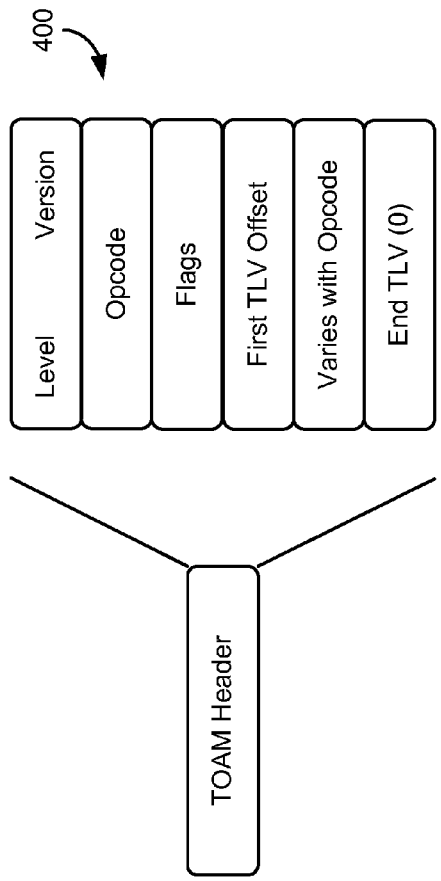
FIG. 4A presents a diagram illustrating the details of the TRILL OAM (TOAM) header in accordance with an embodiment of the present invention.

FIG. 4A presents a diagram illustrating the details of the TOAM header in accordance with an embodiment of the present invention. The first octet of TOAM header 400 includes information regarding level and version, with the higher 3 bits of the first octet dedicated to level information, and the lower 5 bits of the first octet dedicated to version information. The second octet of TOAM header 400 specifies the operation code (opcode) of the current TOAM PDU. The third octet of TOAM header 400 is the flag field, which is used by certain types of TOAM PDUs as specified by the opcode. The fourth octet of TOAM header 400 specifies the offset of the first type-length-value (TLV) field, in units of octets. The length of the next field varies with the opcode. In one embodiment, the next field also includes possible TLV fields. TOAM header 400 also includes an end TLV with its type set as 0, indicating the end of TOAM header 400.

As mentioned previously, to test reachability between two nodes, the system can transmit a reachability-testing request packet from a source node to a destination node, and wait for a reachability-testing response packet returned from the destination node. In one embodiment, both the request and response packets are TRILL-OAM packets, which are distinguishable from each other by the opcode.

Figure 4C:
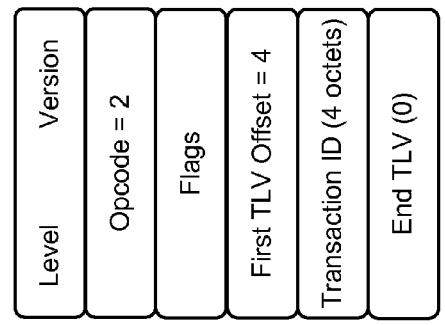
FIG. 4C presents a diagram illustrating the TOAM header of an exemplary reachability-testing response packet in accordance with an embodiment of the present invention.
Figure 4B:
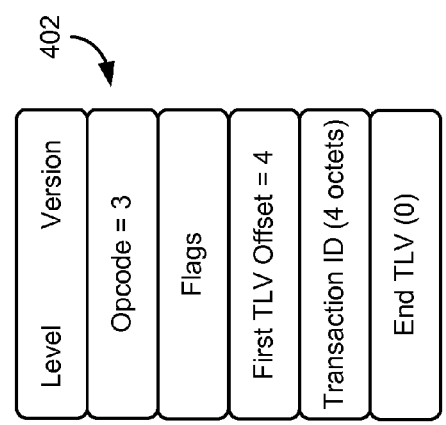
FIG. 4B presents a diagram illustrating the TOAM header of an exemplary reachability-testing request packet in accordance with an embodiment of the present invention.

FIG. 4B presents a diagram illustrating the TOAM header of an exemplary reachability-testing request packet in accordance with an embodiment of the present invention. TOAM header 402 includes common TOAM header fields, such as the level/version field, the opcode field, flags, the first TLV offset field, and the end TLV. Note that the opcode is set as 3, indicating this TOAM packet is a reachability-testing request packet. The first TLV offset is set as 4, indicating that the beginning of the first TLV starts 4 bytes after this field. Between the first TLV offset field and the first TLV (which, in this case, is the end TLV) is a 4-byte transaction identifier (ID) field. The transaction ID increments each time a reachability-testing request packet is sent, and can be used to associate a response with a request.

FIG. 4C presents a diagram illustrating the TOAM header of an exemplary reachability-testing response packet in accordance with an embodiment of the present invention. Similar to TOAM header 402, TOAM header 404 includes common TOAM header fields and a 4-byte transaction ID field. Note that the opcode is set as 2, indicating this TOAM packet is a reachability-testing response packet. The transaction ID of a response packet is the same as the request packet.

Figure 5:
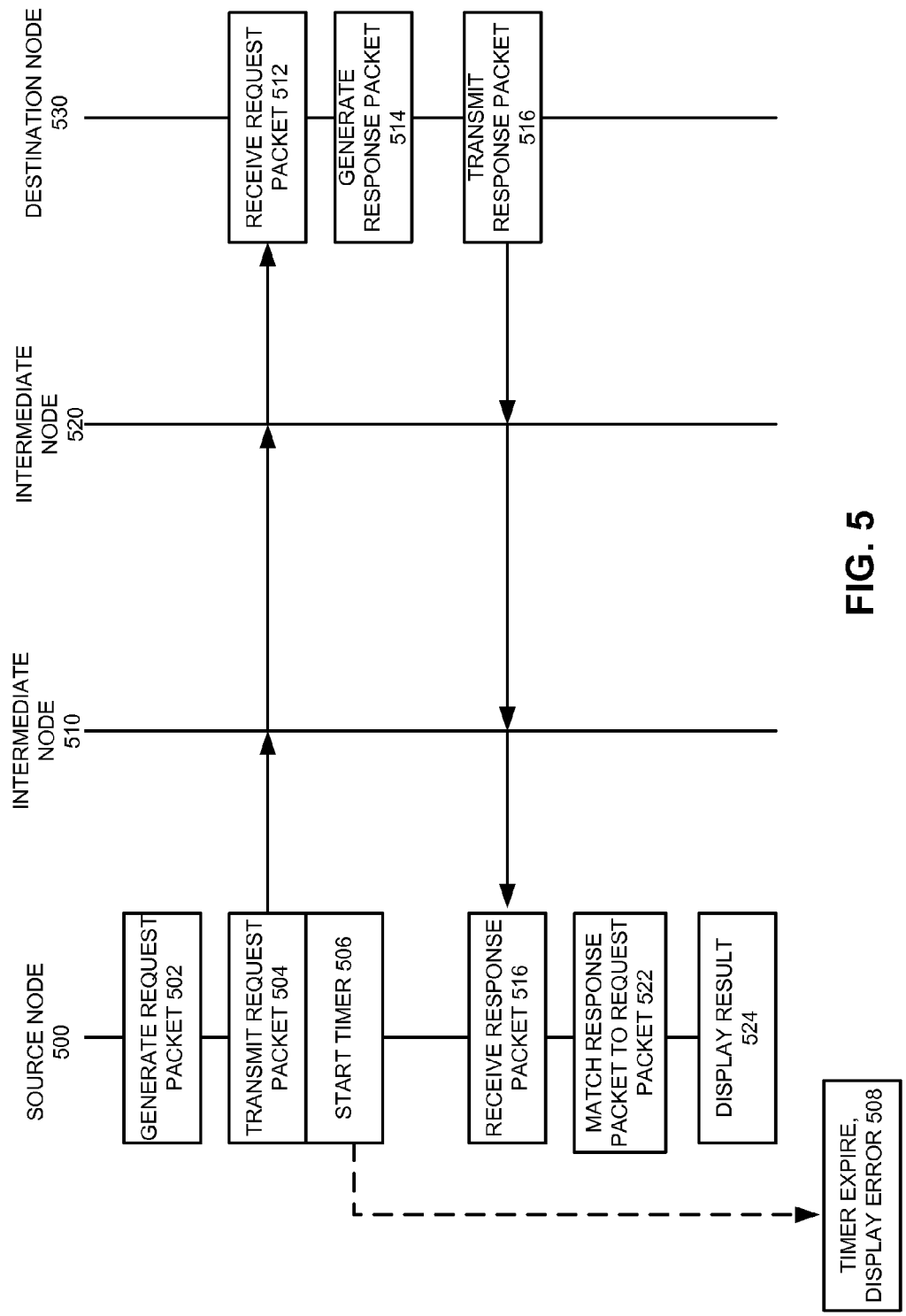
FIG. 5 presents a time-space diagram illustrating the process of testing reachability between two TRILL nodes (RBridges) in accordance with an embodiment of the present invention.

FIG. 5 presents a flowchart illustrating the process of testing reachability between two TRILL nodes (RBridges) in accordance with an embodiment of the present invention. During operation, the source node generates a reachability-testing request packet (also called an l2ping packet), identified by its opcode in the TOAM header (operation 502). In one embodiment, an operator command, such as a command line interface (CLI) command, is used to generate this packet. In a further embodiment, the command line for generating a reachability-testing packet has the following format: l2ping IP|FCoE|MAC <options>.

The l2ping command results in an l2ping request packet, which can be different from the ping packet used in the IP network, being sent. Selection of IP|FCoE|MAC operand indicating the type of network under tested. If IP is selected, the system will send the l2ping packet treating the network as IP over TRILL. In such a case, the l2ping command can have the following format: l2ping IP--domain<domain id>--s<packet-size>--c<packet-count>--i<interval>--p<pattern>, where domain is a 16-bit valid switch domain-id for the destination node, s specifies the size of the l2ping packet, c specifies the number of l2ping packets that will be sent (the default value is 5), i specifies the time interval between successive l2ping packets (the default value is 1 second), and p specifies the "pad" bytes used to fill the packet. If FCoE is selected, the system will send the l2ping packet treating the network as Fibre Channel over Ethernet (FCoE) over TRILL. In such a case, the l2ping command can have the following format: l2ping FCoE--domain<domain id>--s<packet-size>--c<packet-count>--i<interval>--p<pattern>.

If MAC is selected, the system will send the l2ping packet treating the network as a MAC layer, and the l2ping command can have the following format: l2ping MAC {--src_mac<src_mac>}-dst_mac<dst_mac>--vlan<vlan>--ingress_port<ingress_port>--domain<domain id>--s<packet-size>--c<packet-count>--i<interval>--p<pattern>. Src_mac specifies the MAC address of the source node, which is optional. If the source MAC address is specified, it has to be either a MAC address that has been learned by the RBridge or the RBridge's own MAC address. If the source MAC address is not specified, then the system will use the RBridge's own MAC address when constructing the l2ping packet. Dst-mac specifies the MAC address of the destination node, vlan specifies the VLAN ID, and ingress_port specifies the ingress port number. The rest of the command line is similar to that of the l2ping command used for IP and FCoE. In one embodiment, the l2ping MAC command results in a reachability-testing request TOAM packet being sent from the source node to the destination node. The opcode within the TOAM is set as 3 (as shown in FIG. 4B) indicating the packet is a reachability-testing request packet. The outer MAC DA and the outer MAC SA fields within the TOAM packet are set as the destination and source MAC addresses specified by the l2ping command, respectively. As a result, the packet will be routed to the node specified by that destination MAC address. The system also assigns a transaction ID, which increments each time a request packet is sent, to the l2ping request packet. Note that the inclusion of the source MAC address allows a user to test reachability between two remote nodes; that is, a user can instruct a remote source node to send an l2ping packet to a remote destination node.

The l2ping request packet is then transmitted from source node 500 to a destination node 530 (operation 504). Note that appropriate routing is performed by each intermediate node, such as nodes 510 and 520, before the l2ping request packet reaches destination node 530. In addition, each intermediate node decrements the hop counts of the l2ping request packet. Upon the transmission of the l2ping packet, initiating node 500 starts a timer with a predetermined value (operation 506).

Note that, if the timer expires before an l2ping response packet is received by initiating node 500, an error message will be generated indicating that a response has not been received within the time window specified by the predetermined timer value (operation 508).

Once destination node 530 receives the l2ping request packet (operation 512), it generates an l2ping response packet based on the l2ping request packet (operation 514). The l2ping response packet has a similar format as the request packet. In one embodiment, the response packet is a reachability-testing response TOAM packet. The opcode within the TOAM is set as 2 (as shown in FIG. 4C) indicating the packet is a reachability-testing response packet. The transaction ID within the response packet is kept the same as that of the request packet, and the outer MAC DA and SA of the response packet are set as the outer MAC SA and DA of the request packet, respectively. In one embodiment, the inner MAC DA and SA are also switched when a request packet is converted into the response packet. Subsequently, destination node 530 sends the response packet back to source node 500 (operation 516). Upon receiving the response packet (operation 518), source node 500 matches the received response packet to one of the outstanding request packets based on the transaction ID (operation 522), and displays the successful arrival of the response packet (operation 524). The displayed result identifies the destination node along with the round trip time statistics. If the transaction ID of the received response packet does not match any of the outstanding request packets, the response packet is discarded.

Figure 6:
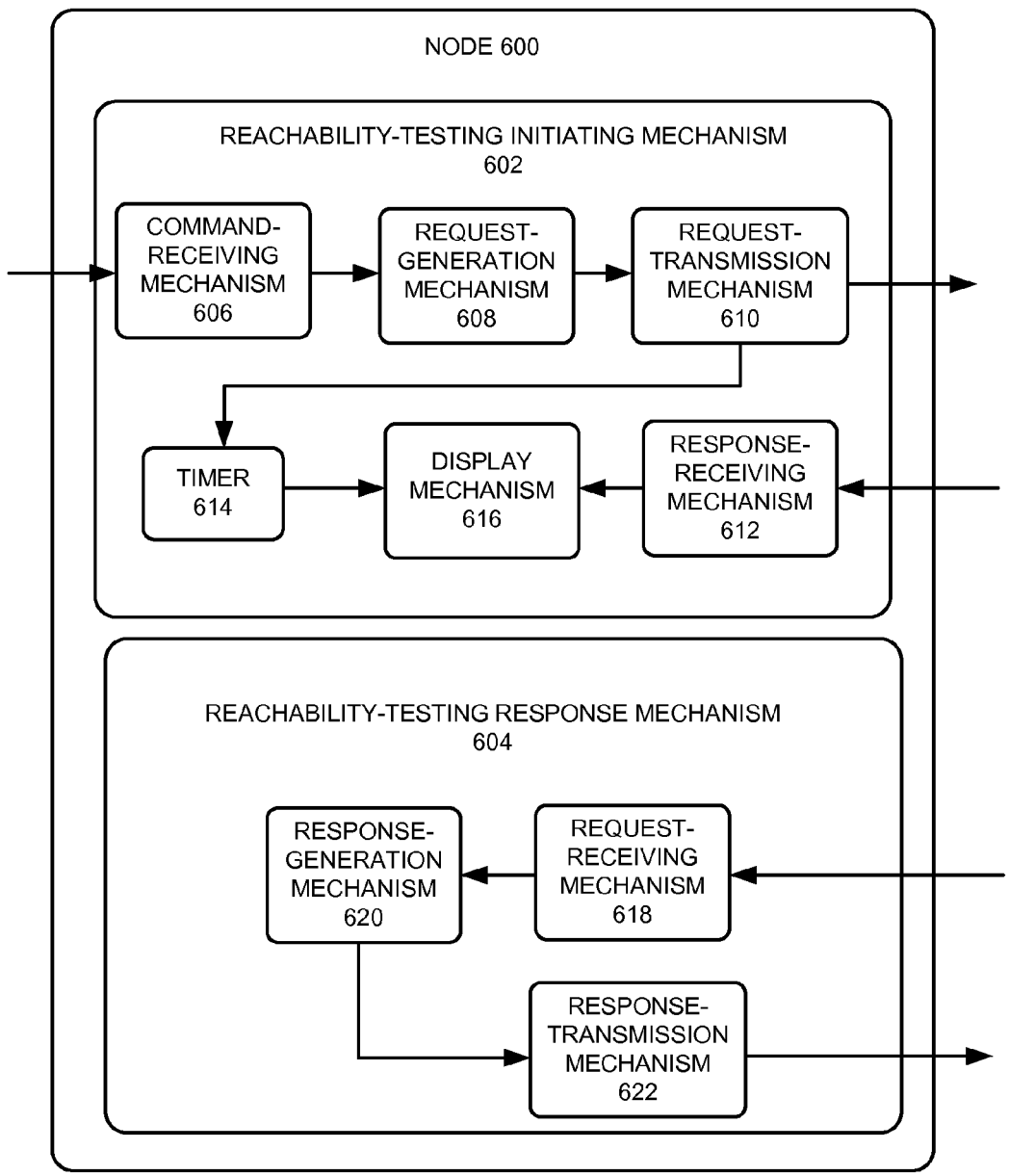
FIG. 6 presents a diagram illustrating the architecture of an exemplary TRILL network node enabling the reachability-testing operation in accordance with an embodiment of the present invention.

FIG. 6 presents a diagram illustrating the architecture of an exemplary TRILL network node enabling the reachability-testing operation in accordance with an embodiment of the present invention. TRILL network node 600 includes a reachability-testing initiating mechanism 602 configured to initiate a reachability test and a reachability-testing response mechanism 604 configured to respond to the reachability-testing request. Reachability-testing initiating mechanism 602 includes a command-receiving mechanism 606, a request-generation mechanism 608, a request-transmission mechanism 610, a response-receiving mechanism 612, a timer 614, and a display mechanism 616. Reachability-testing response mechanism 604 includes a request-receiving mechanism 618, a response-generation mechanism 620, and a response-transmission mechanism 622.

During operation, command-receiving mechanism 606 receives a reachability-testing command, which can be from a remote host. Upon receiving the command, request-generation mechanism 608 generates a reachability-testing request packet using parameters specified by the command. Request-transmission mechanism 610 transmits the request packet to the destination node and starts timer 614. If timer 614 expires before a corresponding response packet is received by response-receiving mechanism 612, an error message is displayed by display mechanism 616. If a valid response is received by response-receiving mechanism 612, then display mechanism 616 will display the arrival of the response packet along with the round trip time statistics. Request-receiving mechanism 618 is configured to receive a reachability-testing request packet, and response-generation mechanism 620 is configured to generate a reachability-testing response packet upon the receipt of a request packet. In one embodiment, response-generation mechanism 620 generates the response packet by switching the source MAC address and the destination MAC address of the received request packet while keeping the transaction ID unchanged. The generated response packet is then transmitted to the initiating node specified by the destination MAC address included in the response packet.

Packet Flow Option 1

Figure 7B:
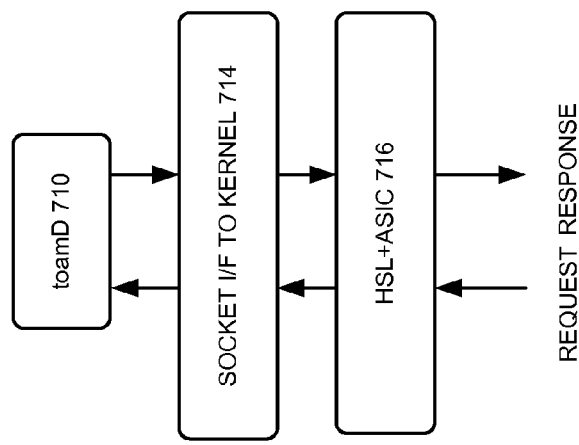
FIG. 7B presents a diagram illustrating the detailed flow of the reachability-testing request and response packets within a TRILL network node that responds to the reachability test in accordance with an embodiment of the present invention.
Figure 7A:
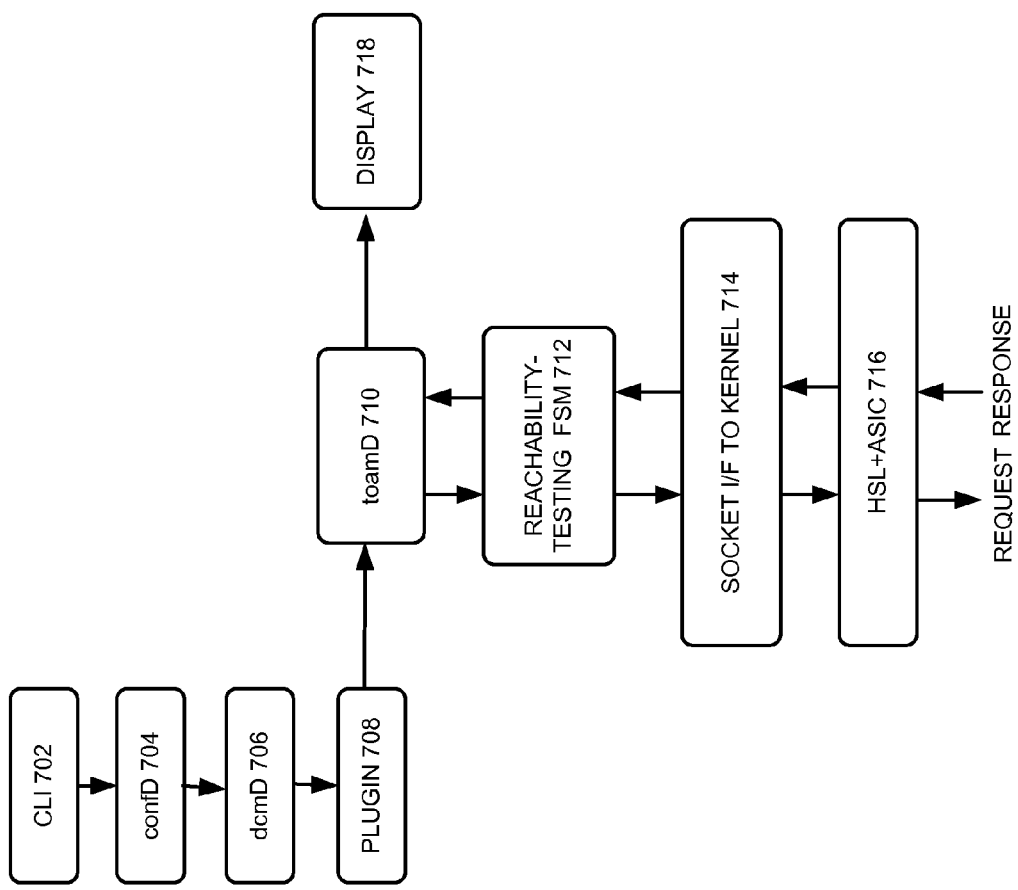
FIG. 7A presents a diagram illustrating the detailed flow of the reachability-testing request and response packets within a TRILL network node that initializes the reachability test in accordance with an embodiment of the present invention.

FIG. 7A presents a diagram illustrating the detailed flow of the reachability-testing request and response packets within a TRILL network node that initializes the reachability test in accordance with an embodiment of the present invention. During operation, a reachability-testing request command is executed via a CLI module 702 running on a processor, invoking a configuration background process (also called a daemon) confD 704 developed by the Tail-f Systems of Round Hill, Va. ConfD 704, in turn, executes the command based on a predetermined set of rules. The confD-Gateway does the translation, creates a message, and dispatches it to a WAVE daemon, dcmD 706. In dcmD 706, a plugin 708, specific to that command, is invoked to validate the data that has been entered. Plugin 708 then sends a message to a TRILL OAM daemon, toamD 710, which runs in the user space, to execute the reachability-testing request. A reachability-testing finite state machine (FSM) 712 creates a reachability-testing request packet, starts a timer, and communicates with the kernel via a socket interface 714 using a newly created socket family, such as AF_TOAM or AF_PACKET. The created request packet makes its way through the high-speed-link (HSL) and the application-specific integrated circuit (ASIC) driver 716, and then goes out on the wire. When a reachability-response packet is received, it gets to HSL and ASIC driver 716 and the kernel, and then the response packet reaches reachability-testing FSM 712 running in toamD 710 via socket interface 714. The reachability-response packet is processed by toamD 710, and the response is sent to display 718.

FIG. 7B presents a diagram illustrating the detailed flow of the reachability-testing request and response packets within a TRILL network node that responds to the reachability test in accordance with an embodiment of the present invention. During operation, the target of the reachability test receives a reachability-testing request packet, which makes its way to the kernel via HSL and ASIC driver 716. The request packet then reaches toamD 710 via socket interface 714. ToamD 710 processes the received request packet and generates a reachability-testing response packet based on the request packet. The response packet is sent back via socket interface 714 to the kernel. Subsequently, the response packet is sent out on the wire via HSL and ASIC driver 716.

This option generates and processes reachability-testing request and response packets using a daemon (toamD) running in the user space. Such an approach makes debugging easier. However, a new daemon needs to be invoked, and communication is needed between the dcmD plugin specified for the reachability-testing command and the newly invoked daemon; such requirements occupy resources and increase system complexity.

Packet Flow Option 2

FIG. 8A presents a diagram illustrating the detailed flow of the reachability-testing request and response packets within a TRILL network node that initializes the reachability test in accordance with an embodiment of the present invention. During operation, a reachability-testing request command is executed via a CLI module 802 running on a processor, invoking a configuration background process (also called a daemon) confD 804. ConfD 804, in turn, executes the command based on a predetermined set of rules. The confD-Gateway does the translation, creates a message, and dispatches it to a WAVE daemon, dcmD 806. In dcmD 806, a plugin 808, specific to that command, is invoked to validate the data that has been entered. Plugin 808 invokes a worker thread, which runs in the user-space, to execute the reachability-testing request. The worker thread then communicates with the kernel via a socket interface 810 using a newly created socket family, such as AF_TOAM or AF_PACKET. The HSL module 812 in the kernel invokes reachability-testing FSM 814, which creates the reachability-testing request packet. The created request packet makes its way through HSL module 812 and ASIC driver 816, and then goes out on the wire. When a reachability-response packet is received, it gets to ASIC driver 816 and HSL module 812 in the kernel. Subsequently, the response packet gets to reachability-testing FSM 814, which processes the response and sends it to display 818.

FIG. 8B presents a diagram illustrating the detailed flow of the reachability-testing request and response packets within a TRILL network node that responds to the reachability test in accordance with an embodiment of the present invention. During operation, the target of the reachability test receives a reachability-testing request packet, which makes its way to HSL module 812 via ASIC driver 816. HSL module 812 then invokes a reachability-testing responder module 820, which processes the request packet and generates a reachability-testing response packet. The response packet is sent back to HSL module 812 and ASIC driver 816 before it goes out on the wire.

This option does not require a new daemon to be invoked. However, generating the request and processing the response partially occur in the kernel space, which makes debugging more difficult.

Packet Flow Option 3

FIG. 9A presents a diagram illustrating the detailed flow of the reachability-testing request and response packets within a TRILL network node that initializes the reachability test in accordance with an embodiment of the present invention. During operation, a reachability-testing request command is executed via a CLI module 902 running on a processor to invoke a configuration background process (also called a daemon), such as confD 904. ConfD 904, in turn, executes the command based on a predetermined set of rules. The confD-Gateway does the translation, creates a message, and dispatches it to a WAVE daemon, dcmD 906. In dcmD 906, a plugin 908, specific to that command, is invoked to validate the data that has been entered. Plugin 908 invokes a worker thread, which runs in the user-space, to execute the reachability-testing request by invoking reachability-testing FSM 910. Reachability-testing FSM 910 creates the reachability-testing request packet, starts a timer, and communicates with the kernel via a socket interface 912 using a newly created socket family, such as AF_TOAM or AF_PACKET. The created request packet makes its way through HSL and ASIC driver 914, and then goes out on the wire. When a reachability-response packet is received, it gets to the kernel via HSL module and ASIC driver 914. Subsequently, the response packet gets to reachability-testing FSM 910 via socket interface 912, which processes the response and sends it to display 916.

FIG. 9B presents a diagram illustrating the detailed flow of the reachability-testing request and response packets within a TRILL network node that responds to the reachability test in accordance with an embodiment of the present invention. During operation, the target of the reachability test receives a reachability-testing request packet, which makes its way to HSL module and ASIC driver 914. Through socket interface 912, the request packet arrives at a reachability-testing responder module 918, which processes the request packet and generates a reachability-testing response packet. The response packet is then sent back to HSL module and ASIC driver 914 before it goes out on the wire.

This option integrates the advantages of both previous options. No additional daemon is needed as the process runs in the dcmD context, and debugging is easier as the process is running in the user space.

Reachability-Testing FSM

Figure 10:
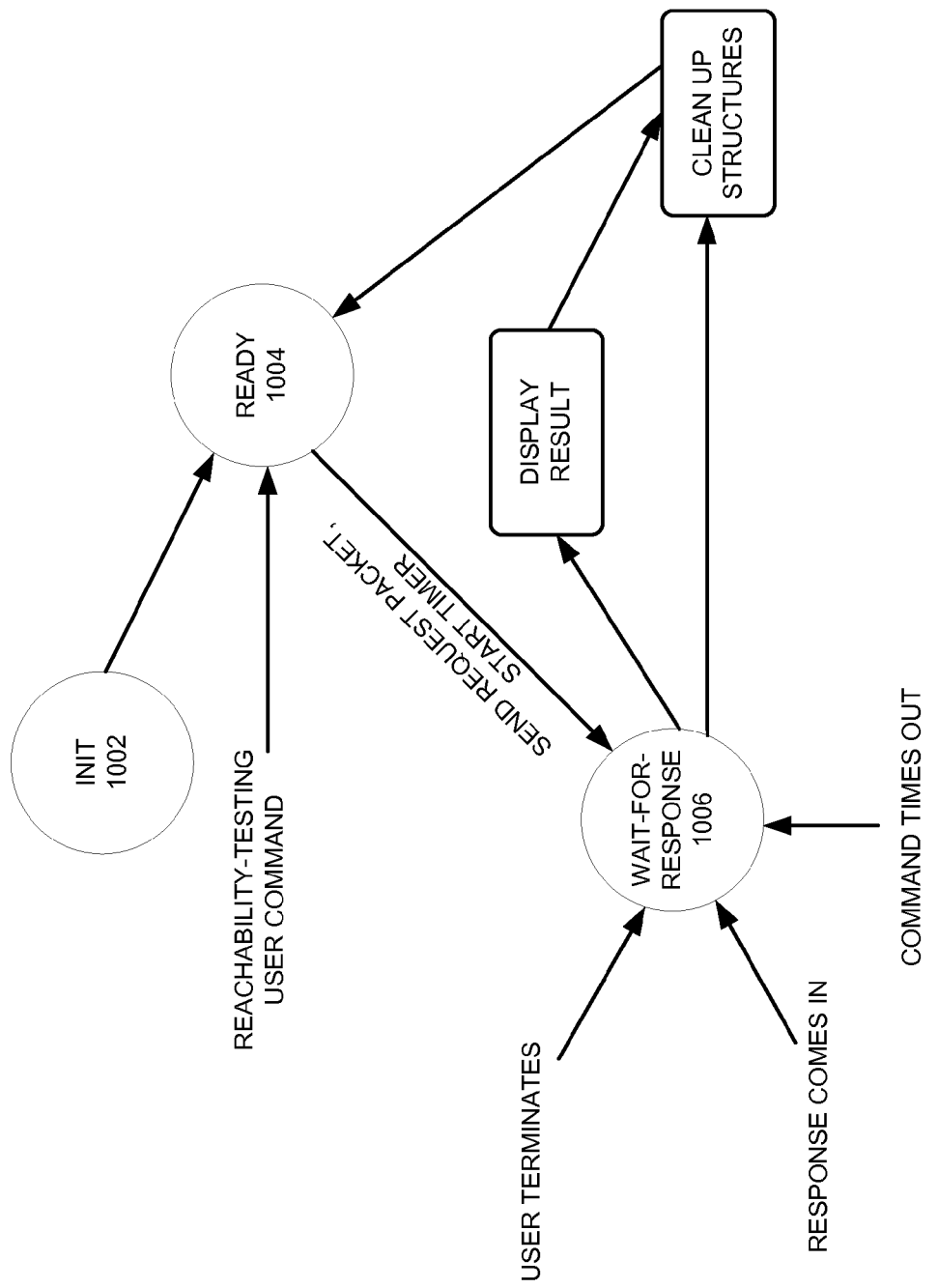
FIG. 10 presents a state diagram of an exemplary reachability-testing finite state machine (FSM) in accordance with an embodiment of the present invention.

FIG. 10 presents a state diagram of an exemplary reachability-testing finite state machine (FSM) in accordance with an embodiment of the present invention. Reachability-testing FSM 1000 includes three states: initial state 1002, ready state 1004, and wait-for-response state 1006.

After system initialization, FSM 1000 moves from initial state 1002 to ready state 1004. During operation, a reachability-testing user command causes FSM 1000 to move from ready state 1004 to wait-for-response state 1006. Valid events in wait-for-response state 1006 include user termination, arrival of a response, and command times out. These valid responses cause the system to display the result of the reachability test, clean up the data structures, and return to ready state 1004. On the other hand, an invalid event will cause the system to clean up the data structure, and return to ready state 1004. Note that, at any given time, a number of simultaneous reachability-testing requests can exist as long as the number does not exceed a predetermined threshold. To implement FSM 1000, the system can allocate individual data blocks, each representing the states and other aspects of a reachability-testing request.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method, comprising:
   processing a command to test reachability in a Transparent Interconnection of Lots of Links (TRILL) network, wherein the command specifies a type of layer two or layer three network operating on top of the TRILL network;
   generating a network-test request flame based at least on the specified type of layer two or layer three network operating on top of the TRILL network and an address of a destination node;
   transmitting a network testing request frame from a source node to a destination node; and
   in response to a network-testing response frame corresponding to the network-testing request frame, determining reachability of the destination node.

2. The method of claim 1, wherein the network-testing request frame or the network-testing response frame includes an Ethernet frame.

3. The method of claim 2, wherein the Ethernet frame includes a field which indicates that the Ethernet frame is an Operation, Administration, and Management (OAM) frame.

4. The method of claim 1, wherein the network-testing request frame or the network-testing response frame is a Transparent Interconnection of Lots of Links (TRILL) frame.

5. The method of claim 4, wherein the network-testing request frame or the network-testing response frame includes TRILL headers comprising an address of the destination node in an outer media access control (MAC) destination address (DA) field.

6. The method of claim 4, wherein the network-testing request frame or the network-testing response frame includes TRILL headers and an encapsulated Ethernet frame, and wherein an Ethertype field of the encapsulated Ethernet frame specifies that the network-testing request frame or the network-testing response frame is a TRILL OAM frame.

7. The method of claim 6, wherein the encapsulated Ethernet frame includes a TRILL OAM header field.

8. The method of claim 7, wherein the TRILL OAM header field includes an operation code (opcode) field, and wherein the opcode field specifies whether a TRILL OAM frame is a request frame or a response frame.

9. The method of claim 7, wherein the TRILL OAM header field includes a transaction identifier, and wherein the network-testing request frame and the corresponding network-testing response frame have the same transaction identifier.

10. The method of claim 1, further comprising determining a round trip time between the time when the network-testing request frame is transmitted and the time when the network-testing response frame is received.

11. A switch, comprising:
    a processing mechanism configured to process a command to test reachability in a Transparent Interconnection of Lots of Links (TRILL) network, wherein the command specifies a type of layer two or layer three network operating on top of the TRILL network;
    a packet generator configured to generate a network-test request flame based at least on the specified type of layer two or layer three network operating on top of the TRILL network and an address of a destination node; and
    a transmission mechanism configured to transmit a network testing request frame from a source node to a destination node; and
    a determination mechanism configured to determine, in response to receiving the network-testing response frame corresponding to the network-testing request frame, reachability of the destination node.

12. The switch of claim 11, wherein the network-testing request frame or the network-testing response frame includes an Ethernet frame.

13. The switch of claim 11, wherein the Ethernet frame includes a field which indicates that the Ethernet frame is an Operation, Administration, and Management (OAM) frame.

14. The switch of claim 11, wherein the network-testing request frame or the network-testing response frame is a Transparent Interconnection of Lots of Links (TRILL) frame.

15. The switch of claim 14, wherein the network-testing request frame or the network-testing response frame includes TRILL headers comprising an address of the destination node in an outer media access control (MAC) destination address (DA) field.

16. The switch of claim 14, wherein the network-testing request or response frame includes TRILL headers and an encapsulated Ethernet frame, and wherein an Ethertype field of the encapsulated Ethernet frame specifies that the network-testing request frame or the network-testing response frame is a TRILL OAM frame.

17. The switch of claim 16, wherein the encapsulated Ethernet frame includes a TRILL OAM header field.

18. The switch of claim 17, wherein the TRILL OAM header field includes an operation code (opcode) field, and wherein the opcode field specifies whether a TRILL OAM frame is a request frame or a response frame.

19. The switch of claim 17, wherein the TRILL OAM header field includes a transaction identifier, and wherein the network-testing request frame and the corresponding network-testing response frame have the same transaction identifier.

20. The switch of claim 11, further comprising a round trip time calculator configured to calculate the round trip time between the time when the network-testing request frame is transmitted and the time when the network-testing response frame is received.

21. An apparatus, comprising:
 means for processing a command to test reachability in a Transparent Interconnection of Lots of Links (TRILL) network, wherein the command specifies a type of layer two or layer three network operating on top of the TRILL network;
 means for generating a network-test request frame based at least on the specified type of layer two or layer three network operating on top of the TRILL network and an address of a destination node;
 means for transmitting a network testing request frame from a source node to a destination node; and
 means for, in response to a network-testing response frame corresponding to the network-testing request frame, determining reachability of the destination node.

* * * * *

UNITED STATES PATENT AND TRADEMARK OFFICE
CERTIFICATE OF CORRECTION

PATENT NO. : 8,885,488 B2
APPLICATION NO. : 12/950974
DATED : November 11, 2014
INVENTOR(S) : Suresh Vobbilisetty et al.

It is certified that error appears in the above-identified patent and that said Letters Patent is hereby corrected as shown below:

In the Claims

In claim 1 (at column 11, line 62), please correct the word "flame" to "frame" so the line reads --generating a network-test request frame based at least on--

In claim 11 (at column 12, line 46), please correct the word "flame" to "frame" so the line reads --request frame based at least on the specified type of layer--

Signed and Sealed this
Thirtieth Day of June, 2015

Michelle K. Lee
*Director of the United States Patent and Trademark Office*